Feb. 1, 1938.                J. GOGAN                2,107,114
                      HARDNESS TESTING DEVICE
                      Filed March 6, 1935         3 Sheets-Sheet 1
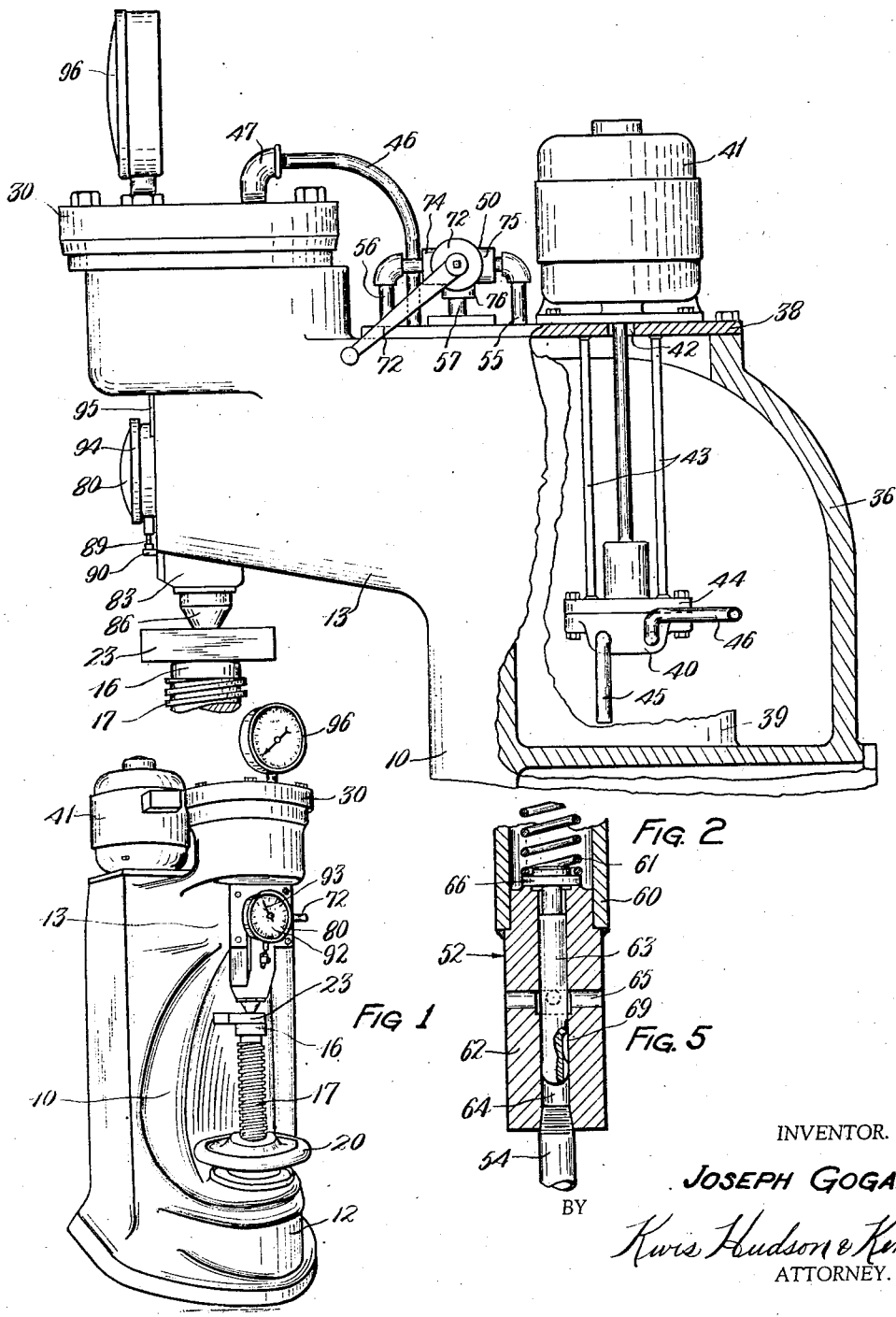
INVENTOR.
JOSEPH GOGAN
BY
Kwis Hudson & Kent
ATTORNEY.

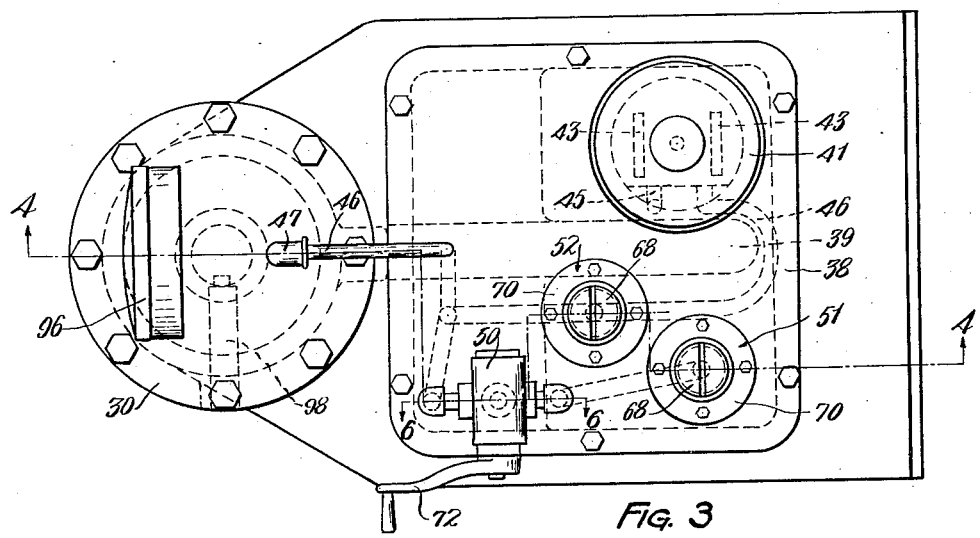
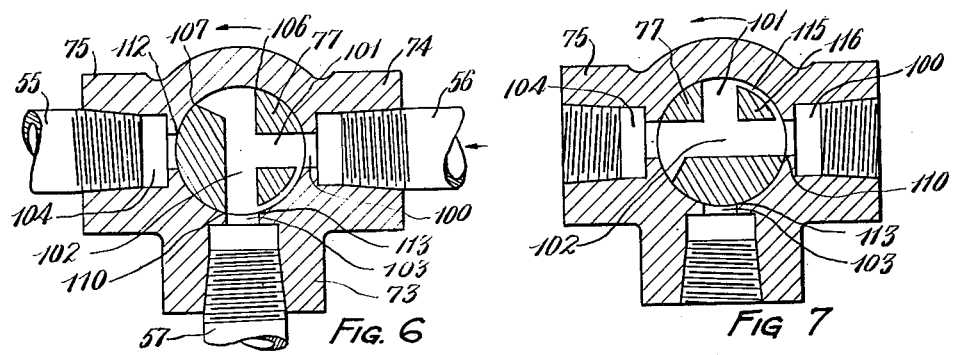
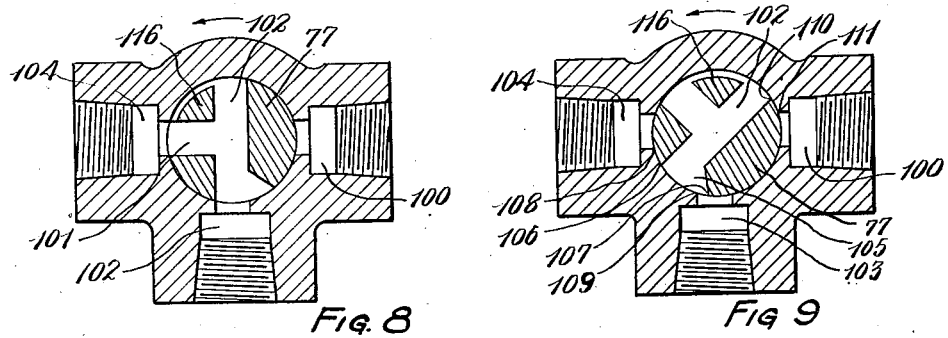

Patented Feb. 1, 1938

2,107,114

UNITED STATES PATENT OFFICE 2,107,114

HARDNESS TESTING DEVICE

Joseph Gogan, Lakewood, Ohio

Application March 6, 1935, Serial No. 9,622

7 Claims. (Cl. 265—14)

This invention relates to hardness testing, and more particularly, to an improved testing device of the type wherein fluid pressure means is employed to subject a specimen to a predetermined test load, and a measurement of the corresponding distortion produced in the specimen is taken as an indication of the hardness thereof.

The present invention is an improvement over the testing apparatus disclosed in copending application Serial No. 654,988, filed February 3, 1933 now Patent No. 2,009,316, issued July 23, 1935.

An object of this invention is to provide an improved testing machine, of the type referred to, having novel fluid pressure means for accurately obtaining the desired predetermined load or loads on the specimen.

Another object of the invention is to provide an improved testing machine, of the type mentioned, which includes a fluid reservoir and has a pressure fluid supply pump disposed in the reservoir.

Still another object of this invention is to provide a testing machine embodying novel pressure fluid supply means, including a reservoir having a pump and one or more pressure relief valves disposed therein.

It is also an object of this invention to provide an improved testing machine having pressure fluid means for supplying a test load including a recess formed in the frame of the machine to constitute a reservoir.

A further object of the invention is to provide an improved testing machine of compact and efficient form, wherein the frame of the machine is constructed with a fluid reservoir therein, and wherein a pump and control valves are mounted on the reservoir cover.

The invention may be further briefly summarized as consisting in certain novel combinations and arrangements of parts hereinafter described and particularly set out in the appended claims.

In the accompanying drawings,

Fig. 1 is a perspective view showing a testing machine constructed according to my invention.

Fig. 2 is a side elevation of the upper part of the machine with a portion of the frame broken away.

Fig. 3 is a plan view of the machine.

Fig. 5 is a partial sectional view taken through one of the relief valves and illustrating the construction thereof on a somewhat larger scale.

Fig. 6 is a sectional view taken on line 6—6 of Fig. 3 to illustrate the port arrangement of the manually operable control valve.

Figs. 7, 8 and 9 are similar views of the manually operable valve, but showing different settings thereof.

Figure 4:
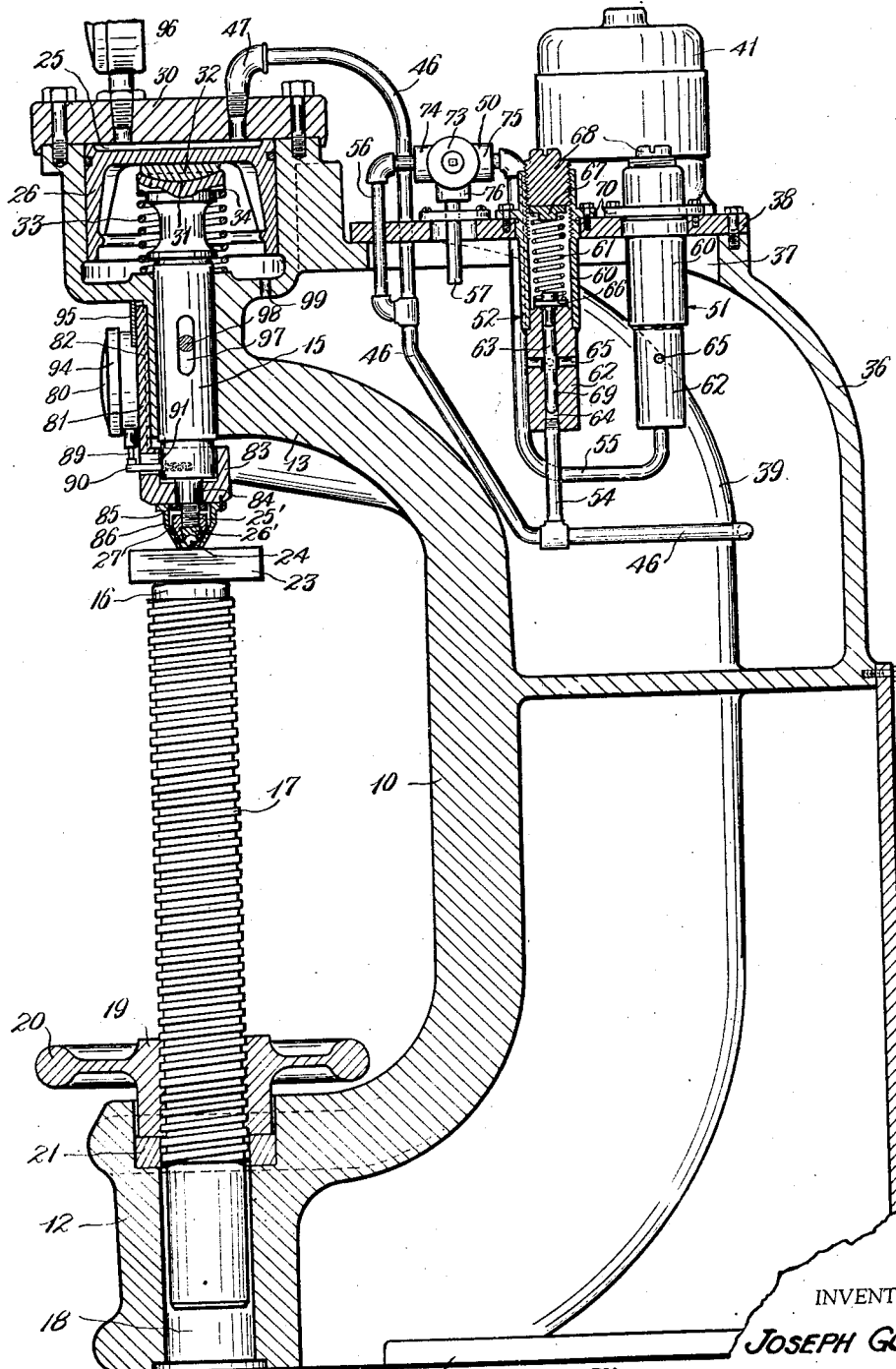
Fig. 4 is a vertical sectional view through the machine taken on line 4—4 of Fig. 3.

In the accompanying drawings to which detailed reference will now be made, I have illustrated an improved form of hardness testing machine which is of highly simplified and very compact construction but which is extremely accurate and reliable. Although the drawings illustrate what I now regard to be a preferred form of the invention, it should be understood, however, that the drawings are illustrative only and that the invention may be embodied in various other machines and apparatus.

My improved testing machine is provided with a frame 10 which may be of cast metal or any other suitable construction. In this instance I show the frame as being a frame of the gap type, although frames of various other forms or types could be used. The frame here shown is provided with a base 11 which permits the machine to be conveniently mounted or stood upon a bench or other suitable support.

The frame 10 may be constructed with substantially vertically aligned laterally projecting portions 12 and 13 which form the top and bottom of the gap part of the frame. The laterally projecting portion 12 constitutes a work supporting portion, and the laterally projecting portion 13 constitutes a head which provides a mount for the test spindle 15 as well as other parts of the apparatus. The work supporting portion 12 of the frame is provided with a suitable anvil 16 which is made adjustable, preferably by being carried on a vertically elongated screw 17. This screw extends into an opening 18 of the frame and also extends through a threaded opening provided in the hub 19 of a hand wheel 20. The lower end of the hub 19 may engage a suitable bearing 21 provided on the frame so that the thrust of the anvil will be transmitted through the bearing. The anvil may be adjusted upwardly or downwardly with respect to the head 19 by rotating the hand wheel 20 in the proper direction.

The test spindle 15 is mounted for vertical movement in the head 13 of the frame, preferably with the axis of the spindle substantially aligned with the axis of the screw 17. The lower end of the spindle projects from the head of the frame and carries a penetrator for engagement with a specimen 23 supported upon the anvil 16. The penetrator may be of any suitable form, and in this instance is shown in the form of a Brinell ball 24. The upper end of the spindle 15 extends into a cylinder 25 which may be formed integral with or mounted upon the upper portion of the frame. A piston 26 is operable in the cylinder 25 for supplying a test load to the spindle.

The Brinell ball 24 may be mounted upon the lower end of the spindle in any suitable manner, such as by means of the arrangement shown in Fig. 4 of the drawings. As a part of this arrangement I provide the lower end of the spindle with a threaded stem portion 25' of reduced diameter upon which the Brinell ball is carried. The ball may be held by a chuck comprising an abutment block 26' and a tapered sleeve 27. The abutment block 26' has a spherical recess in which the ball 24 seats and has an extension stem which extends into an axial opening of the threaded stem 25'. The tapered sleeve 27 of the chuck is screwed onto the stem 25' and holds the ball seated against the abutment block 26'.

The cylinder 25 is provided with a suitable cover 30 for the upper end thereof, so that when pressure fluid is introduced in the cylinder between the cover and the piston 26, the latter will be moved downwardly to cause the spindle 15 to press the penetrator 24 against the specimen 23. As a feature of my invention I provide a novel connection between the piston 26 and the upper end of the spindle 15. This connection permits relative tilting or rocking between the piston and the spindle and eliminates undesirable stresses which might otherwise result from slight misalignment or angularity between the axis of the cylinder and the axis of the spindle. This connection may comprise a thrust recess 31 in the upper end of the spindle and a thrust block 32 engaging or connected with the underside of the piston. The thrust block and the recess of the spindle have curved surfaces in slidable engagement with each other which correspond substantially in shape with the surface of a spheroidical segment. This connection will accommodate slight tilting of the piston with respect to the axis of the spindle, so that undesirable lateral thrust on the spindle will be avoided even though the axis of the cylinder is not correctly aligned with the axis of the spindle bearing.

A coil spring 33 may be disposed around the upper portion of the spindle 15 with its ends engaging, respectively, the bottom of the cylinder and the shoulder 34 of the spindle. This spring opposes the action of the pressure fluid in the cylinder and lifts or retracts the spindle and piston when the fluid pressure is relieved.

As an important part of my invention I provide novel pressure fluid means for supplying motive fluid to the cylinder 25 to actuate the piston therein and thus apply the desired predetermined test load on the penetrator. This novel pressure fluid means includes a reservoir 36, which may be formed as a recess in an integral part of the frame 10 of the machine and is preferably located in the upper part of the frame, as shown in Figs. 2 and 4. The reservoir may be located on any other desired part of the frame and may be of any size or shape found to be desirable. In this instance the reservoir is in the form of such a pocket or recess and has an opening 37 at the top of the frame which may be closed by a plate-like cover 38. In the machine shown in this particular instance, a web 39 of the frame extends into the reservoir chamber, but this constitutes no important part of the present invention, and in other arrangements may not be present.

It will be understood, of course, that a suitable motive fluid, such as oil, partially fills the reservoir 36. A portion of this fluid is withdrawn from the reservoir and supplied, under pressure, to the cylinder 25 to actuate the piston 26 therein. For supplying the fluid to the cylinder at an operating pressure, I provide a pump 40 of suitable construction having an electric driving motor 41 directly connected therewith.

As a feature of my invention I mount the pump and driving motor on the cover 38 of the reservoir, preferably with the motor located above the cover and with the pump below the cover and disposed within the reservoir. The motor may be mounted on the cover 38 with its shaft in a substantially vertical position and extending through a cover opening 42 into the reservoir where it has driving connection with the pump 40. The pump may be conveniently mounted upon the cover 38 by means of a bracket, comprising spaced plates 43 connected to and depending from the underside of the cover, and a flange or shelf 44 at the lower end of the spaced plates and to which the pump 40 is connected. The plates 43 of the bracket may be of such length as to locate the pump within the reservoir at any desired elevation, but I prefer to construct the bracket of a length to submerge the pump in the body of liquid contained in the reservoir. The pump has a suction pipe 45 connected therewith and a discharge pipe 46 which extends around the web 39, as shown in Fig. 4, and then extends forwardly and upwardly through the cover 38 and is connected to the cylinder 25 by means of the fitting 47 provided on the cylinder cover.

For controlling the operation of the machine for the performance of a hardness test when desired, I provide a manually operable valve 50, and for obtaining the desired predetermined pressure values for the motive fluid I provide automatically operable pressure relief valves 51 and 52. These valves, in combination with the pump and cylinder in an arrangement to be presently explained, constitute a novel pressure fluid supply and control means. As another feature of my invention, I prefer to mount the manual valve 50 and the relief valves 51 and 52 on the reservoir cover 38, so that these members and the pump together form a compact assembly unit, and so that the fluid which escapes or is discharged from these valves can be directly returned to the reservoir without the need of elaborate drainage and return piping.

Before proceeding with the detailed description of the control valves, I wish to explain at this time that it is desirable in certain hardness testing machines to apply a preliminary or minor test load to the penetrator, and to subsequently apply a main or major test load thereto. The minor test load may be of a value to cause the penetrator to break through the decarburized surface of the specimen and through any dirt or scale adhering thereto. This minor test load also causes burrs or irregularities on the underside of the specimen to be flattened out against the anvil 16, so that there will be little or no subsequent movement between the test piece and anvil when the major test load is applied. The minor test load also may be used in measuring the surface hardness of the specimen, as will be explained hereinafter in connection with the operation of the machine in making tests.

To obtain these predetermined minor and major test loads on the penetrator, I supply motive fluid to the cylinder at corresponding predetermined pressure values. To obtain these desired predetermined pressure values for the motive fluid, I employ the relief valves 51 and 52, the relief valve 51 being the low pressure relief valve and the valve 52 being the high pressure relief valve.

The high pressure valve 52 has the inlet thereof permanently connected with the fluid conduit 46 by the pipe 54. The low pressure relief valve 51 may be connected with or disconnected from the conduit 46 by means of the manual valve 50 and piping 55 and 56. The manual valve 50 is a three-way valve, of special construction as will be explained hereinafter, and has a return pipe 57 leading directly to the reservoir 36.

The relief valves 51 and 52 are of similar if not identical construction, and hence only one thereof need be described in detail. The relief valve has a tubular housing 60 which forms a chamber for a coiled compression spring 61. A plug member 62 is mounted at the lower end of the tubular housing 60 and has a plunger valve 63 slidable therein. At the lower end of the plug member 62, I provide a fluid inlet opening 64 to which the pipe 54 is connected, and at an intermediate point of the plug member I provide one or more fluid discharge openings 65 which are controlled and normally closed by the plunger valve 63. The plunger valve extends upwardly into the chamber of the tubular housing 60 and has a collar or plate 66 thereon against which the compression spring 61 bears to normally urge the plunger valve downwardly to its closed position shown in Fig. 4. The upper end of the spring 61 bears against a pressure plate 67 which, in turn, engages the lower end of an adjusting plug 68 which is screwed into the upper part of the tubular housing 60.

From the arrangement just described, it will be seen that the lower end of the plunger valve 63 is exposed to the pressure of the fluid in the inlet 64 and that movement of the valve by such pressure is opposed by the coiled spring 61. When the pressure of the fluid in the pipe 46 and the valve inlet 64 becomes great enough to lift the plunger valve 63 in opposition to the action of the spring 61, the discharge openings 65 will be connected with the inlet 64 and pressure fluid will be released through the discharge openings directly into the reservoir. The pressure at which such release occurs may be set at a desired predetermined value by adjustment of the plug 68.

The plunger valve may have any suitable shape or form, but I find that a valve of the construction herein illustrated operates very efficiently for the purpose desired. To prevent chatter and noise when the plunger valve 63 allows fluid to pass through the discharge openings, I prefer to construct the valve with a rounded lower end as shown in the drawings. For this purpose I also prefer to provide a groove 69 of appropriate size and shape in the surface of the plunger. When the plunger valve is lifted, communication between the inlet and the discharge openings 65 is first established through this groove, and when communication between the inlet and discharge is being cut off by closing movement of the valve, it is first reduced to the groove 69. The rounded lower end of the plunger tends to eliminate turbulence, and this in combination with the groove 69, provides for a quietly and efficiently operating relief valve.

As shown in the drawings, the relief valves 51 and 52 are preferably mounted on the reservoir cover 38 with a portion of the valve housing 60 extending above the cover, but with the major portion of the valve structure extending below the cover and into the reservoir. For conveniently mounting the valves on the cover I provide each of the valve housings with a flange 70 adjacent its upper end which may be bolted or otherwise secured to the reservoir cover. In the arrangement here shown, only the upper portion of the valve housing which contains the spring adjusting plug 68 extends above the reservoir cover.

The manually operable valve 50 is preferably mounted on the top of the reservoir cover, so that the operating handle 72 thereof may be readily accessible to the operator of the machine. This valve is provided with a housing 73 having an inlet 74 to which the pipe 56 is connected, and outlets 75 and 76 to which the pipes 55 and 57 are connected respectively. This valve also has a rotatable plug 77 which is rotatable in the valve housing 73 and may be actuated by means of the lever 72. The valve plug is provided with fluid passages, as will be hereinafter explained, so that by moving the hand lever 72 to one of two different positions the relief valves 51 and 52 may be selectively rendered operable to determine or limit the pressure of the fluid to be supplied to the cylinder, and so that by movement of the lever 72 to a third position all of the fluid delivered by the pump is returned to the reservoir through the pipe 57.

For the purpose of measuring the penetration of the specimen by the ball 24 under the predetermined test load, I provide a depth measuring gauge 80 which is mounted upon a movable gauge supporting bracket 81. This gauge bracket has an upwardly extending part 82 upon which the gauge is mounted, and a cup-like hollow lower part 83 which is loosely guided upon the lower portion of the spindle 15 with the reduced portion 84 of the spindle extending through an opening of this hollow bracket part. A nut 85 screwed on the reduced threaded stem 25' of the spindle retains the gauge bracket in proper operating relation to the spindle.

A contact part or "feeler" 86 is provided on the lower part of the gauge bracket for engagement with the specimen at a point adjacent the point contacted by the penetrator 24. The feeler 86 is preferably in the form of a cup member which is disposed around the holder for the penetrator ball. The lower end of this feeler may be tapered or frusto-conical, to conform to the shape of the chuck which holds the penetrator ball, and to bring the point of contact of the feeler close to the point of contact for the penetrator.

The gauge 80 is operated in response to relative movement between the spindle 15 and the gauge bracket 81, and for this purpose I provide the gauge with an actuating stem 89 which cooperates with a bracket or pin 90 of the spindle which may be mounted to extend outwardly through an opening 91 of the bracket. The gauge itself may be of any suitable construction and is preferably of the type having a dial 92 bearing suitable indications, and a movable pointer 93. A spring contained in the gauge housing normally tends to advance the pointer and to move the gauge stem 89 in a direction outwardly of the housing. Such movement of the pointer and of the gauge stem is prevented, however, except when the spindle 15 moves downwardly relatively to the gauge supporting bracket. The gauge also preferably has a rotatable rim 94 connected with the dial 92 so that the latter may be adjusted relative to the pointer. A suitable cover plate 95 may be disposed adjacent the gauge housing to improve the appearance of the machine and to serve as a retainer and guide for the upwardly extending part 82 of the gauge bracket.

A pressure gauge 96 may be mounted on the cylinder cover 30 to visibly indicate the pressure of the fluid in the cylinder acting upon the piston 26.

As shown in Fig. 4 of the drawings, the spindle 15 may be provided with an elongated opening 97 to receive a transverse pin 98 which is mounted in the head of the frame. The pin 98 operates in the slot 97 to prevent rotation of the spindle which might otherwise interfere with the proper cooperation of the bracket 90 with the gauge stem 88. The cylinder may, if desired, be provided with a drain opening 99 leading to the reservoir 36.

In the operation of my improved testing machine the operator places a specimen 23 upon the anvil 16. At this time the motor driven pump 40 is operating continuously and is discharging pressure fluid into the conduit 46. Also, at this time the position of the hand lever of the valve 50 is such that fluid from the conduit 46 flows through the pipe 56, through the valve 50 and back to the reservoir 36 through the pipe 57. The by-passing of the fluid back to the reservoir through the pipe 57 prevents any pressure from building up in the cylinder 25.

With the specimen in position on the anvil 16 the operator moves the hand lever 72 to an intermediate position which causes the by-pass pipe 57 to be closed and causes the low pressure relief valve 51 to be connected with the conduit 46. Pressure now builds up in the cylinder 25 and causes the piston 26 to move downwardly and to press the penetrator 24 against the specimen. When the pressure of the fluid becomes great enough to produce the desired predetermined minor or preliminary load value to which the low pressure relief valve 51 has been set, this valve operates to limit the pressure to the desired value by releasing fluid into the reservoir through the discharge openings 65.

When the spindle is thus moved downwardly by the pressure fluid acting on the piston 26, the feeler 86 of the gauge bracket and the penetrator 24 are brought into engagement with the specimen. The gauge bracket with the gauge thereon is thereafter supported upon the test piece, while the preliminary test load causes the penetrator to move through the surface of the specimen. When the minor load has been fully applied and the gauge pointer comes to rest, the operator rotates the rim 94 of the gauge housing and thereby adjusts the gauge dial to bring the zero thereof in registration with the then position of the pointer. This is done while the minor load pressure is maintained on the spindle.

The operator then moves the hand lever 72 to a position which disconnects the low pressure valve 51 from the conduit 46. The pressure then builds up in the conduit 46 and in the cylinder 25 until it is limited by the operation of the high pressure relief valve 52 to discharge fluid into the reservoir through the openings 65. The application of this major load causes the penetrator to move farther into the specimen while the gauge bracket and gauge remain relatively stationary. This causes the gauge pointer to be moved through a distance proportionate to the depth of penetration of the specimen by the ball 24, and this gauge reading may be taken as an indication of the sub-surface hardness of the specimen. The operator then returns the hand lever 72 to its original position and this setting for the valve 50 allows fluid from the conduit 46 to be directly returned or by-passed to the reservoir and also allows the pressure previously existing in the cylinder to be relieved so that the piston and spindle can be retracted by the spring 33.

Should the operator wish to measure the surface hardness of a specimen he would first make a test on a specimen of known hardness, by applying the minor load thereto in the manner explained above. He would then note the reading obtained from the gauge 80. The operator would then proceed to make a test of the surface hardness of a specimen by subjecting the same to the minor load and noting the reading of the gauge in comparison with the reading obtained therefrom during the test on the specimen of known hardness.

As mentioned above, the manually operable control valve 50 is a three-way valve of special design and, in Figs. 6 to 9 inclusive, I have illustrated the different settings for the valve plug 77 and have shown novel features of construction thereof. Fig. 6 shows the valve plug in the position corresponding with the starting or off position for the valve handle 72. With the valve plug at this setting, pressure fluid from the conduit 46 is supplied to the valve inlet 74 through the pipe 56 and passes through inlet port 100 and through passages 101 and 102 of the valve plug. At this time the passage 102 registers with a discharge port 103 in the outlet 76 of the valve and the fluid flows directly back to the reservoir 36 through the pipe 57. At this time the valve plug 77 closes the discharge port 104 of the valve outlet 75 which leads to the low pressure relief valve 51.

In Fig. 7 of the drawings I show the valve plug 77 as having been rotated 90° to a position which corresponds with an intermediate position for the operating handle 72. With this setting of the valve plug, the port 103 is closed and the port 104 of the outlet 75 is connected with the inlet port 100 by the plug passage 102. Fluid is now supplied to the low pressure relief valve in the manner explained above and the pressure builds up in conduit 46 and the cylinder 25 to cause the minor load to be applied.

In Fig. 8, I show the plug 77 of the valve 50 moved to the position corresponding with the major load applying position of the operating handle 72. With the plug in this position the inlet port 100 of the valve is closed and the discharge port 104 is connected with the by-pass or relief port 103. At this time no fluid can enter the valve 50 from the conduit 46, but, on the other hand, the pressure existing in the pipe 55 and in the inlet of the low pressure valve 51 is released through the passages 101 and 102 of the valve plug.

Fig. 9 shows a position of the valve plug 77 just prior to its arriving at the setting shown in Fig. 8 for the application of the major load, and illustrates the need for an undercut or port enlargement 105 at one end of the passage 102. The undercut 105 is so formed that the edges 106 and 107 will be spaced apart an angular distance which is less than the spacing of the edges 108 and 109. This relative spacing is important because it is desirable to have the point 110 of the passage 102 pass the point 111 of the inlet port 100 prior to the opening of the passage 102 into the discharge port 103 by the point 107 passing the point 109. If such provision were not made, pressure from the conduit 46 would flow through the passage 102 and be returned to the reservoir through the pipe 57 for a short period of time during the shifting of the valve. This would result in a dropping of the pressure after the application of the minor load, with a succeeding rise in pressure as the point 110 of the valve plug passes the point 111 for the application of the major load.

Similarly, when the valve is to be moved from the initial setting shown in Fig. 6 to the position shown in Fig. 7 for the application of the minor test load, it is important that the point 107 reach the point 112 at the same time or before the point 110 reaches the point 113. If the point 107 does not pass the point 112 before the point 110 passes the point 113, it will be seen that both discharge ports 103 and 104 would then be closed and high pressure, corresponding with the major test load value, would be built up in the conduit 46 and in the cylinder. However, when the point 107 passes the point 112 before the point 110 passes the point 113, it will be seen that fluid will be supplied to the low pressure relief valve 51 before the by-pass port 103 is fully closed.

It is also desirable to provide the plug 77 of the valve 50 with a peripheral groove 115 connecting the passages 101 and 102 as shown in Figs. 6 to 9. The purpose of this peripheral groove is to prevent the inlet port 100 from being closed by the segment 116 of the valve plug during rotation of the latter from the position of Fig. 6 to the position of Fig. 7. If the port 100 were to be closed at this time it would result in the building up of the high pressure in the conduit 46 and in the cylinder 25. This passage, however, allows fluid to continue to flow through the plug to the discharge port 103 until after the point 107 has passed the point 112.

From the foregoing description and the accompanying drawings it will now be seen that I have provided an improved form of hardness testing machine which is extremely compact and highly simplified, but which is nevertheless very efficient and is capable of rapid operation for the performance of successive hardness tests by relatively inexperienced operators. It will be understood further that I have provided a fluid pressure operated hardness testing machine, wherein novel pressure fluid supply and control means accurately provides the pressure values required for producing desired predetermined minor and major test loads.

While I have illustrated and described the testing machine of my invention in a somewhat detailed manner, it should be understood, however, that I do not wish to be limited to the precise details of construction and arrangements of parts herein disclosed, but regard the invention as including such changes and modifications as do not involve a departure from the spirit of the invention and the scope of the appended claims.

Having thus described my invention, I claim:

1. In a testing machine the combination of a frame having thereon a specimen supporting means and a test load applying means movable relative to the supporting means, a fluid containing reservoir, fluid pressure responsive means having operative connection with said load applying means for actuating the same, a pump having a discharge connection for supplying fluid from said reservoir under pressure to said responsive means, a pair of pressure relief valves adjusted to be opened respectively by fluid pressure corresponding substantially with a predetermined preliminary test load and a predetermined main test load, and means including a manually operable valve for selectively rendering said relief valves effective for controlling the pressure of the pump discharge.

2. In a testing machine the combination of a frame, an anvil on said frame, a test spindle movable on said frame, a penetrator, fluid pressure responsive means for actuating said spindle to cause the penetrator to be pressed into a specimen, a fluid containing reservoir formed in a part of said frame, a pump submerged in the fluid of said reservoir and having a discharge connected with said responsive means, a cover for said reservoir, an electric motor mounted on said cover and having driving connection with said pump, a pressure relief valve in said reservoir and connected with the pump discharge for regulating the pressure therein, and means for measuring the depth of penetration of said specimen.

3. In a testing machine the combination of a frame having a movable test spindle thereon, pressure fluid responsive means for actuating said spindle, a source of pressure fluid, a conduit connecting said source with said responsive means, a relief valve connected with said conduit and operable to control the pressure therein, a second relief valve operable at a different fluid pressure, and a manually operable valve having one setting for releasing the pressure of the fluid in the conduit and another setting for connecting said second relief valve with said conduit.

4. In a testing machine the combination of a frame having a movable test spindle thereon, pressure fluid responsive means for actuating said spindle, a source of pressure fluid, a conduit connecting said source with said responsive means, a relief valve connected with said conduit and operable to limit the pressure therein to a relatively high working value, a second relief valve operable at a relatively lower fluid pressure, and a manually operable valve having one setting for releasing the pressure of the fluid in the conduit and another setting for connecting said second relief valve with the conduit, said valve having ports arranged to prevent the building up of the relatively higher pressure in said conduit during shifting of the valve from its first mentioned setting to its second mentioned setting.

5. In a testing machine the combination of a frame having a movable test spindle thereon, pressure fluid responsive means for actuating said spindle, a source of pressure fluid, a conduit connecting said source with said responsive means, a relief valve connected with said conduit and operable to limit the pressure therein to a relatively high working value, a second relief valve operable at a relatively lower fluid pressure, and a manually operable valve having ports providing one setting for releasing the pump discharge into the reservoir and a second setting for operably connecting said second relief valve with the conduit and a third setting for disconnecting said second relief valve to cause the first mentioned relief valve to regulate the pressure in said conduit.

6. In a testing machine the combination of a frame having thereon a specimen supporting means and a test load applying means movable relative to the supporting means, a penetrator, a fluid containing reservoir on said frame, fluid pressure responsive means having operative connection with said load applying means for actuating the same to press the penetrator into a specimen, a cover for the reservoir, pressure fluid supply and control means mounted on the cover and therewith constituting an assembly unit, said fluid supply and control means projecting from the underside of said cover so as to extend into the reservoir when the cover is applied thereto, conduit means providing fluid conducting connections between the supply and control means of said unit and between said unit and said fluid pressure responsive means, and means for indicating the depth of penetration of a specimen.

7. In a testing machine the combination of a frame having thereon a specimen supporting means and a test load applying means movable relative to the supporting means, a penetrator, a fluid containing reservoir on said frame, fluid pressure responsive means having operative connection with said load applying means for actuating the same to press the penetrator into a specimen, a cover for the reservoir, pressure fluid supply and control means mounted on the cover and therewith constituting an assembly unit, said fluid supply and control means projecting from the underside of said cover so as to extend into the reservoir when the cover is applied thereto and comprising a motor driven pump, relief valve means for regulating the pressure of the pumped fluid, and a manually operable control valve, conduit means providing fluid conducting connections between the pump and valve means of said unit and between said unit and said pressure responsive means, and means for indicating the depth of penetration of a specimen.

JOSEPH GOGAN.